(12) United States Patent
Bhattacharjya et al.

(10) Patent No.: US 7,428,076 B2
(45) Date of Patent: Sep. 23, 2008

(54) SMART COPYING FOR VARIABLE COST, EDITABLE PRINTOUTS

(75) Inventors: Anoop K. Bhattacharjya, Campbell, CA (US); Vasudev Bhaskaran, Sunnyvale, CA (US)

(73) Assignee: Seiko Epson Corporation, Tokyo (JP)

( * ) Notice: Subject to any disclaimer, the term of this patent is extended or adjusted under 35 U.S.C. 154(b) by 872 days.

(21) Appl. No.: 10/909,456

(22) Filed: Aug. 2, 2004

(65) Prior Publication Data
US 2006/0077415 A1 Apr. 13, 2006

(51) Int. Cl.
*G06K 15/00* (2006.01)
(52) U.S. Cl. .............. 358/3.28; 358/474; 358/527; 382/100; 382/317; 705/57
(58) Field of Classification Search ........... 358/474, 358/1.14, 1.13, 1.9, 2.1, 3.28, 539, 426.02, 358/527; 382/232, 135, 100, 284, 312, 317; 705/57; 348/460; 235/494
See application file for complete search history.

(56) References Cited

U.S. PATENT DOCUMENTS

| | | | | |
|---|---|---|---|---|
| 717,018 | A * | 12/1902 | Rhoads et al. ............. 251/361 |
| 5,207,412 | A * | 5/1993 | Coons et al. .............. 270/1.02 |
| 5,225,900 | A * | 7/1993 | Wright ..................... 382/317 |
| 5,606,609 | A * | 2/1997 | Houser et al. .............. 713/179 |
| 5,671,277 | A * | 9/1997 | Ikenoue et al. ............. 382/194 |
| 5,974,202 | A * | 10/1999 | Wang et al. ................ 382/306 |
| 6,304,345 | B1 * | 10/2001 | Patton et al. .............. 358/527 |
| 6,603,864 | B1 | 8/2003 | Matsunoshita |
| 6,674,923 | B1 * | 1/2004 | Shih et al. ................. 382/305 |
| 6,711,277 | B1 * | 3/2004 | Cok ......................... 382/100 |
| 6,862,110 | B2 * | 3/2005 | Harrington ................. 358/1.9 |
| 2001/0030761 | A1 | 10/2001 | Ideyama |
| 2002/0063879 | A1 | 5/2002 | Zeman |
| 2002/0135810 | A1 | 9/2002 | Ikenoue et al. |
| 2002/0161710 | A1 | 10/2002 | Furukawa |
| 2002/0164053 | A1 * | 11/2002 | Seder et al. ................ 382/100 |
| 2003/0016980 | A1 * | 1/2003 | Meunier et al. ............. 400/76 |
| 2003/0038181 | A1 | 2/2003 | Damera-Venkata |
| 2003/0084069 | A1 * | 5/2003 | Boreham et al. ........... 707/200 |
| 2003/0156753 | A1 | 8/2003 | Fan et al. |
| 2003/0165253 | A1 * | 9/2003 | Simpson et al. ............ 382/100 |
| 2004/0067084 | A1 * | 4/2004 | Zerza et al. ................ 400/76 |
| 2005/0141009 | A1 * | 6/2005 | Kiwada ..................... 358/1.14 |

(Continued)

FOREIGN PATENT DOCUMENTS

EP     0 493 091     7/1992

(Continued)

*Primary Examiner*—Kimberly A Williams

(57) ABSTRACT

Smart printing/copying techniques for controlling the printing/copying and editing of a document based on document-descriptive and control information embedded in the printed output. These "smart" printing/copying techniques and controls allow a document user to control printing/copying costs by making tradeoffs with respect to quality and speed based on the embedded data. Such costs may be controlled, for example, by initially printing low cost (low quality, high speed) pages for distribution, while giving subsequent recipients of the document the option of making high quality (higher cost, possibly slower) copies of any or all of the pages in the document, if desired. With these features, a user is able to obtain high quality copies from low quality originals. The techniques of the present invention also allow a recipient to edit page content prior to reprinting, without loss of print output quality.

10 Claims, 4 Drawing Sheets

U.S. PATENT DOCUMENTS

| | | | |
|---|---|---|---|
| 2005/0162697 A1* | 7/2005 | Kiwada | 358/1.18 |
| 2005/0288943 A1* | 12/2005 | Wei et al. | 705/1 |
| 2006/0098236 A1* | 5/2006 | Yamashita et al. | 358/302 |
| 2008/0074682 A1* | 3/2008 | Komatsubara | 358/1.1 |
| 2008/0130039 A1* | 6/2008 | Igarashi et al. | 358/1.15 |

FOREIGN PATENT DOCUMENTS

| | | |
|---|---|---|
| EP | 1197837 A2 * | 4/2002 |
| EP | 1385327 A2 * | 1/2004 |
| WO | 0115382 A1 | 3/2001 |

* cited by examiner

SMART COPYING FOR VARIABLE COST, EDITABLE PRINTOUTS

BACKGROUND OF THE INVENTION

1. Field of the Invention

The present invention relates to techniques for controlling the printing/copying of a document and the subsequent editing of the document by a downstream user prior to printing based on data embedded in the printed output. The embedded data enables a user to control the cost, for example, associated with printing/copying the document. In addition to a content-description, copy- or edit-protection features may also be contained in the embedded data. The techniques may be realized as methods, various aspects/steps of which may be performed by an appropriately configured apparatus (e.g., a computer, printer, copier, etc.). Additionally, a program of instructions (e.g., software) directing such apparatus to perform the methods or steps thereof may be embodied on a medium that is readable by the apparatus.

2. Description of the Related Art

As personal computers and the Internet have become more ubiquitous, the amount of digital content created has increased. At the same time, more and more of that digital content is finding its way into print form. The increasing desire to print digital content has been driven in part by the ease in which text and images generated on, or imported to, a personal computer can be printed. Improvements in the functionality and use of external digital devices such as digital cameras (stand-alone and cell-phone embodied), personal digital assistants and other digital devices have also contributed to the increased printing of digital content. The integration of such digital devices to operate seamlessly with printers and multi-function peripherals that offer print, scan and wired/wireless media connectivity makes printing digital content from these devices a routine task.

With the increase in the printing of digital content, printers have continued to evolve to provide more printing options that represent widely varying cost and output quality tradeoffs. These tradeoffs are significant even for relatively high-resolution printing (e.g., 600 dpi or higher) depending on the choice of platform (ink-jet printers, color laser printers, etc.) and the output medium (recycled paper, glossy photographic paper, etc.).

The ability of printers to generate higher resolution output has allowed the development of data embedding (or watermarking) schemes for printing. The high-resolution capability of printers has made it possible to embed a larger number of bits on the printed page. The embedded data can even be used to encode a PDL description of the document itself so that it could be reconstructed from a printed copy. However, current technology does not provide a data embedding/recovery system whereby reproduction of the carrier document is directly tied to select variables, such as cost, quality and speed, set by the user. Current technology also does not provide a system that can include additional controls, i.e., copy- or edit-protection controls that impose certain restrictions on the subsequent printing/copying or editing of the document.

OBJECTS OF THE INVENTION

Accordingly, it is an object of the present invention to overcome the above-mentioned problems with the current technology.

It is another object of this invention to provide a system whereby a document carries embedded content-descriptive and control information which enables the control of reproducing or editing the document, based on select variables set by the user and based on other controls contained in the embedded data.

SUMMARY OF THE INVENTION

According to one aspect, this invention provides a method for controlling reproduction of a document. The method comprises setting at least one document reproduction variable and scanning a document to recover information embedded in the document. The embedded information includes information enabling a user to render a new document that is a duplicate or variation of the scanned document. The method further includes reproducing some or all of the document or variation thereof in accordance with the setting of the reproduction variable(s) that was/were set prior to scanning the document, subject to any reproduction-control information contained in the embedded information.

The document reproduction variable(s) preferably includes one or more of the following: a quality, a speed or a cost variable.

In one embodiment, the reproduction-control information encodes a password-protected reproduction control scheme in which the reproduction-control information determines what part or parts of the document can be reproduced.

Preferably, the embedded information further contains edit-control information, which may encode a password-protected edit control scheme.

In another aspect, the invention involves an apparatus, which preferably possesses both scanning and printing/copying functions. The apparatus is configured to perform various processing described above in connection with the methods including recovery of information embedded in the document. The recovery algorithm may be conveniently implemented in software that is executed by a processor. Alternatively, the algorithm may be implemented directly with hardware. For example, the algorithm may be embodied in an Application Specific Integrated Circuit (ASIC), digital signal processing circuitry, etc. Other implementations will be apparent to those skilled in the art based on the disclosure herein.

In one embodiment, the scanner and the printer or copier are integrated in the same unit.

In accordance with further aspects of the invention, either of the above-described methods or any of the steps thereof may be embodied in a program of instructions (e.g., software), which may be stored on, or conveyed to, a computer or other processor-controlled device for execution. Alternatively, the program of instructions may be implemented using functionally equivalent hardware (e.g., ASIC, digital signal processing circuitry, etc.) or a combination of software and hardware.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
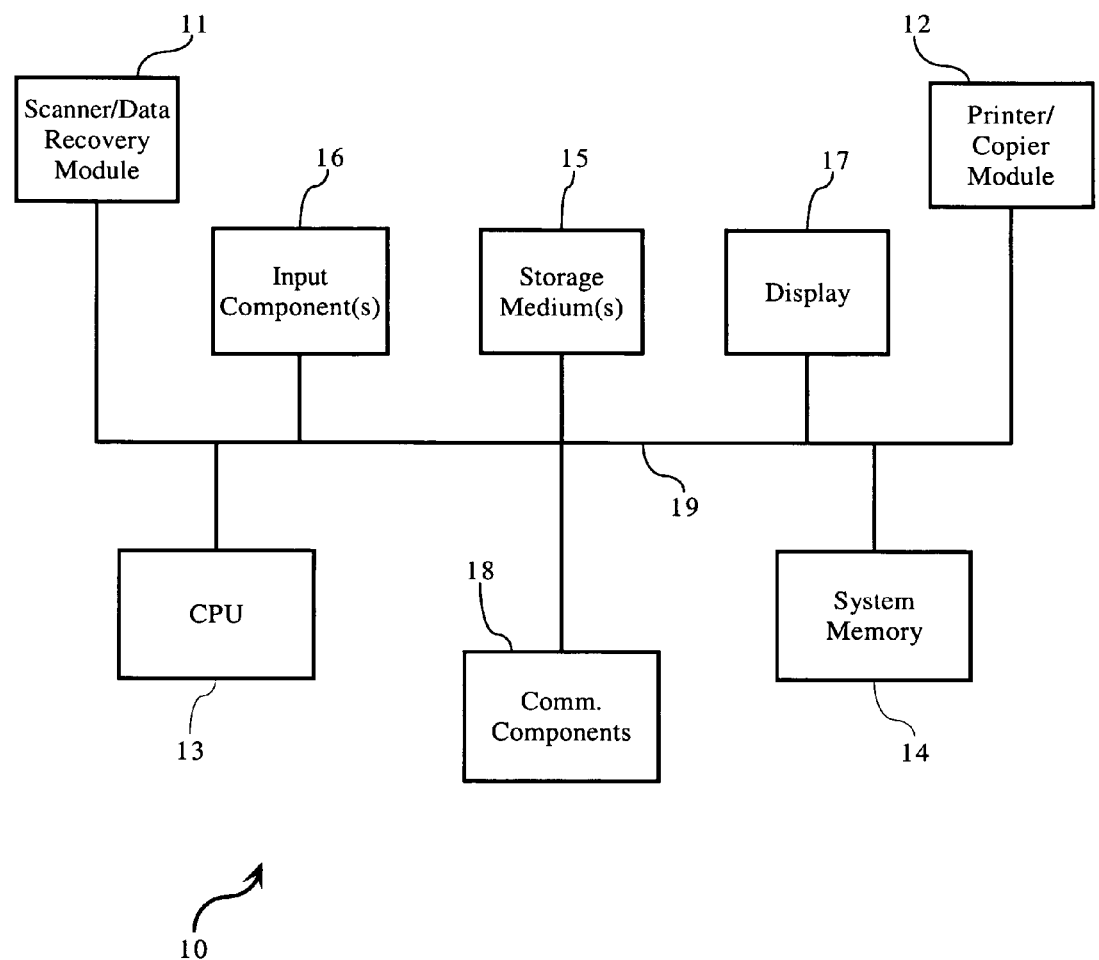
FIG. 1 is a block diagram of an exemplary image processing system that includes scanning and printing/copying capabilities and which is constructed in accordance with embodiments of the present invention.

The present invention provides techniques for controlling the printing/copying and/or editing of a document based on document-descriptive and control information embedded in the printed output. These "smart" printing/copying techniques and controls allow a document user to control printing/copying costs by making tradeoffs with respect to quality and speed based on the embedded data. Such costs may be controlled, for example, by initially printing low cost (low quality, high speed) pages for distribution, while giving subsequent recipients of the document the option of making high quality (higher cost, possibly slower) copies of any or all of the pages in the document, if desired. Thus, in one embodiment, a user is able to obtain high quality copies from low quality originals. In another embodiment, the techniques of the present invention allow a recipient to edit page content prior to printing, without loss of print output quality.

Embedded control information may be used to impose certain restrictions on the reproduction or editing of the document. Such control information may encode a password-protected control scheme whereby only those users with an authorized password can reproduce or edit the document. Control information may also permit reproduction or editing of only some of the carrier document. A multi-level password system may be employed to provide different levels of restrictions for different groups of users. For example, a first group of users may be granted full privileges with respect to reproducing and editing the document. That is, a user in this first group is free to reproduce and edit all or any part of the document as many times as s/he wishes. A second group of users may be granted limited reproducing and editing privileges. Such limitations may be content sensitive (i.e., only part of the document can reproduced or edited), time sensitive (i.e., reproduction/editing privileges expire after a certain time period), or quantity sensitive (i.e., only a certain number of edits or reproductions are enabled). Those with no password privileges would be prevented from editing or reproducing any part of the document.

With respect to the actual embedding of the information (both document-descriptive and control information), the present invention accommodates both visible and invisible embedding techniques. There are a number of different high capacity data embedding/watermarking technologies that can be used in connection with this invention to insert the information, visibly or invisibly, into the source document. Such technologies include watermarking with random zero-mean patches disclosed in U.S. Pat. Nos. 6,522,766 and 6,556,688. The data embedding techniques disclosed in U.S. Pat. No. 6,456,393 or U.S. Pat. No. 6,731,775 may also be used. The content of each of these patents is incorporated by reference herein.

Preferably, bits of data are embedded by modifying the halftone dots or pulses printed on a page. Embedding data visibly or invisibly in printed halftone dots can be implemented in a variety of ways. In one embodiment, the data embedding halftone is printed on the reverse side of a printed page. If the user attempts to make a copy by scanning the reverse side of this printed page, the scanner extracts the page description bits and allows the user to make various modifications to the page or content of interest prior to printing. In another embodiment, the halftone data is embedded in a background page color that is rendered over the empty regions of a page (giving the appearance of printing on colored paper). This is a visible embedding scheme where the user can perform double-sided printing of documents/images. The data capacity of this scheme depends on the overall area of empty space on the page. In still another embodiment, the data is embedded invisibly in the printed documents/images. Invisible watermarking schemes however have much lower data capacity, and thus are suitable for compact page descriptions, or embedding resource locators that point to the location of page description data stored elsewhere.

The recovery and use of the embedded information in accordance with embodiments of the present invention will now be described with reference to FIG. 1, which is a block diagram of an exemplary document processing system that includes scanning, editing and printing/copying capabilities and with reference to FIG. 2, which is a flow diagram generally illustrating the processing involved.

To that end, system 10 comprises a scanner module 11 and a print/copy module 12, as shown in FIG. 1. These modules may be integrated in a single device, as shown in the illustrated embodiment, or implemented as separate devices that are in communication with each other. The system further includes a central processing unit (CPU) 13 that provides computing resources for scanner 11 and printer/copier 12 and controls other aspects of the system as well. CPU 13 may be implemented with any suitable microprocessor or the like and may include auxiliary processors to assist with certain functions. System memory 14 which may be in the form of random-access-memory (RAM) and read-only-memory (ROM) is also provided. A storage medium 15 may be used to record programs of instructions for operating systems, utilities and applications, which may include embodiments of programs that implement various aspects of the present invention. Storage medium 15 may also be used to store information that was embedded in the document and recovered therefrom.

Figure 2:
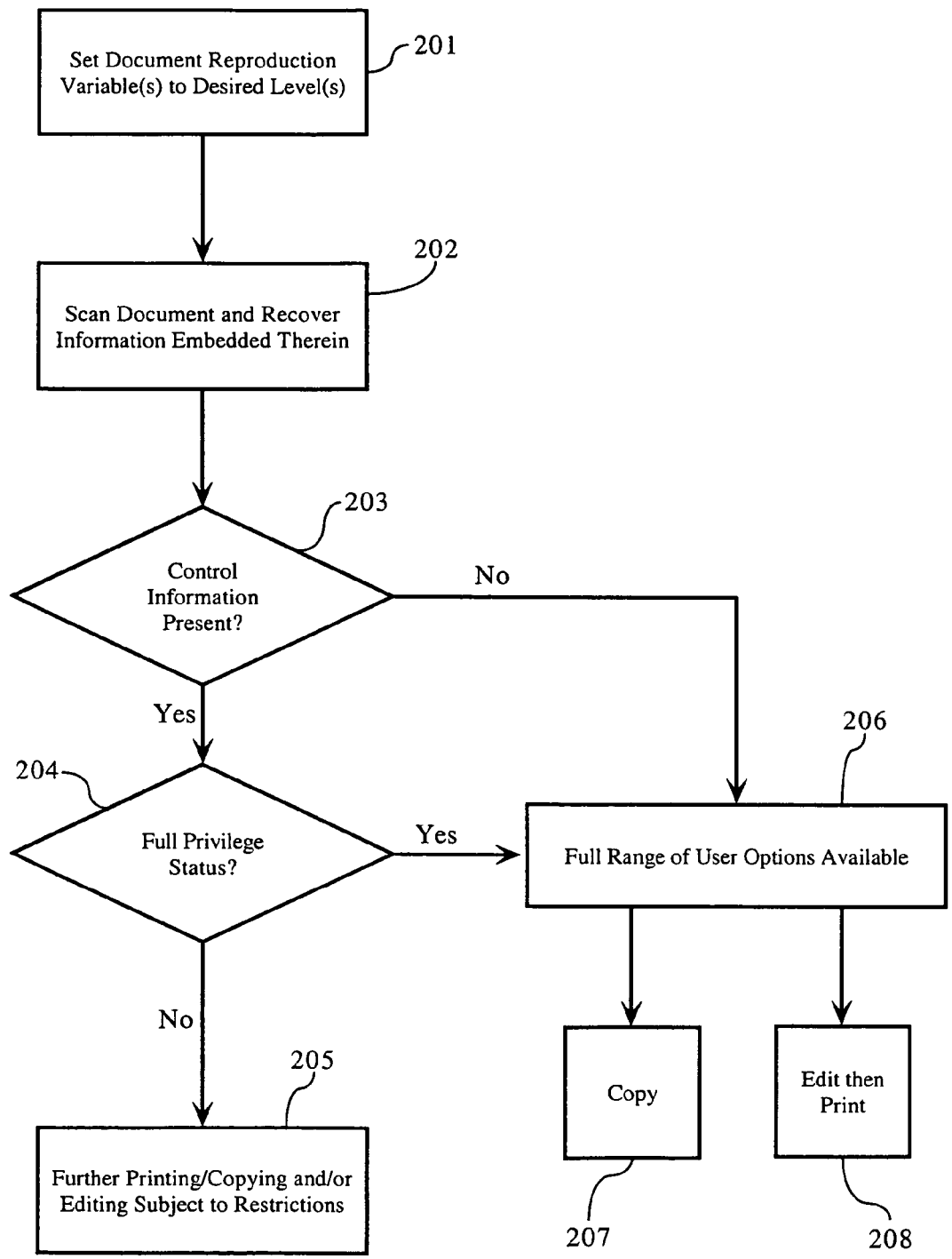
FIG. 2 is a flow diagram illustrating recovery and use of the embedded information in accordance with embodiments of the present invention.
Figure 3:
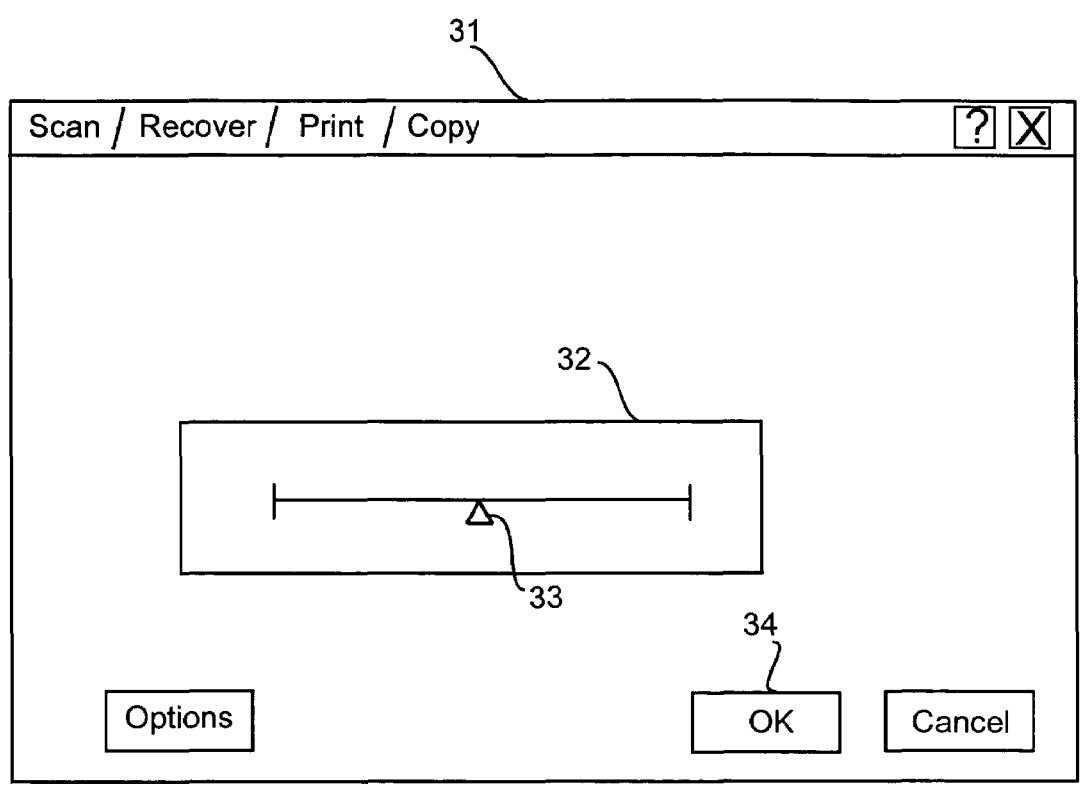
FIG. 3 illustrates a graphical user interface (GUI) of a utility program through which a user sets printing/copying variables in accordance with the invention.

As illustrated in the flow chart of FIG. 2, a user enters desired settings (e.g., cost, quality settings) for recovering the embedded information, editing the document if desired, and reproducing a new document that is a duplicate or variation of the current document (step 201). To facilitate such entry, system 10 includes appropriate input components(s) 16 such as a keyboard, mouse, stylus and/or keypad which the user uses to set printing/copying variables (quality, cost, speed, etc.) Such variables may be conveniently set through a utility program that interacts with the appropriate driver(s) of the printer/copier module 12 installed on system 10. The utility program is likewise installed on system 10 and includes a graphical user interface (GUI) that the user views on a display 17 and interacts with using the appropriate input components. A GUI 31 of this utility program is illustrated in FIG. 3 and shows how a user can set printing/copying variables in accordance with the invention.

In the illustrated embodiment, the utility program's GUI 31 is presented as a window with multiple boxes, buttons, etc. for configuring the scanner/data recovery and printer/copier modules 11 and 12 respectively. The boxes may be in any convenient form, e.g., text entry, pull-down menu, check, etc. and the buttons may be clickable. With these boxes, buttons, etc. the user can set any number of conventional scan and print parameters. In addition, window 31 includes an input control area 32 for setting the printing/copying variables in accordance with the invention. In one embodiment, a single slider control 33 can be used to set a quality/speed variable, ranging from low quality/high speed (which is set by moving the slider to, say, the far left) to a high quality/low speed (which is set by moving the slider to, say, the far right). In another embodiment, a single slider control can be used to control cost directly. The user moves the slider to the desired relative cost setting, with the far right being the least expensive and the far left being the most expensive, for example.

After entering the desired setting(s), the user clicks an appropriate button, (e.g., an OK or Apply button 34), which instructs system 10 to scan the current document and recover the embedded information (step 202).

Figure 4:
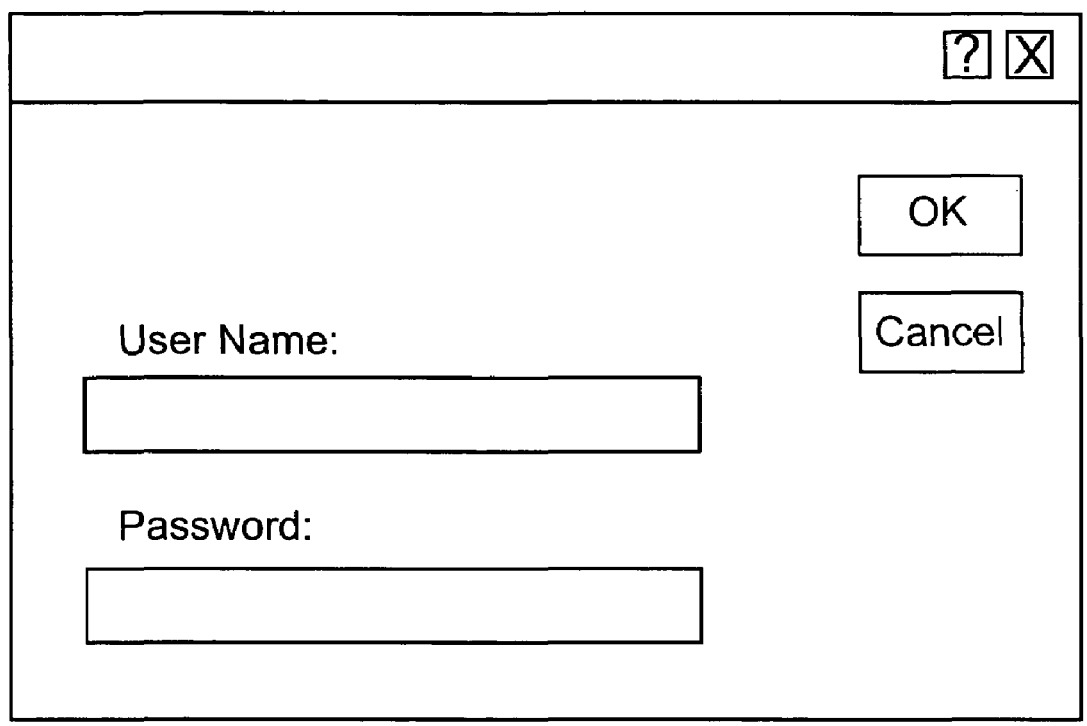
FIG. 4 illustrates a password entry screen, which may be used in accordance with embodiments of the invention.

The recovered information is analyzed to determine if it contains any control information (step 203). If so, certain reproduction and/or editing may be prohibited. The prohibition(s) may be automatically imposed on all users downstream of the one (perhaps the document creator) who had the control information inserted. In another scenario, a password entry screen 41, such as that shown in FIG. 4, may appear on display 17 prompting the user to enter his/her user name and password. Reproduction and editing privileges are then based on the particular password protection scheme that is employed and the user's status in the scheme, i.e., full reproduction and editing privileges, limited privileges, etc. Step 204 checks if the user has full privilege status.

If control information indicates that the user does not have full privilege status, further printing/copying and/or editing is subject to restrictions, as indicated in box 205.

Assuming no control information (step 203: no) or a user with full privileges (step 204: yes), the user is granted access to a full range of options from which he may select (step 206). The document may be copied, that is, reproduced without any changes from the recovered document-descriptive information in accordance with the settings entered by the user (step 207). Alternatively, various editing operations can be performed on the document based on the recovered information (step 208) and then the revised version printed in accordance with the user's settings (step 209).

The various editing operations that can be performed include modifying page content or selecting a portion/section of a page to be printed at a different level of magnification. Such operations can be performed based on the recovered document description. Other functions, such as creating a digital document from the data embedded in a set of printed pages, can also be performed. Advantageously, these operations can be performed without the use of error-prone technologies such as optical character recognition.

Having a printed output that carries its own digital page/content description also simplifies management issues with respect to the storage of digital content that corresponds to a particular printed page. This is particularly relevant to content such a digital camera output. Once a picture is printed, it is difficult to store and manage the corresponding JPEG files. Embedding these files in the halftone allows second and subsequent generation copying without loss of quality, and has the potential of even improving print quality as superior media and printers become available.

There are other advantages as well to having page-descriptive data embedded together with the printed page. The user is still able to make a conventional copy on a conventional copier. This duality adds a layer of robustness to the scheme to allow copying even if the embedded data on a page has been damaged and cannot be recovered completely. A smart copier using embedded data can reproduce regions corresponding to damaged data using a conventional copy of the associated region on the page.

For multi-page digital content, each printed page need only carry sufficient information for its own description. For multi-page documents with short descriptions, e.g., from text/word processing or spreadsheet applications, a single printed page may have the capacity to contain embedded data to recover and allow printing of multiple document pages. In this mode, entire documents may be distributed by distributing a single page or flyer, or a short summary leaflet with a few pages.

Returning to FIG. 1 to complete the description of system 10, it will be seen that system 10 can also include external communication components 18 that can communicate with external devices to send and receive information (i.e., programs and data) including data to be printed in accordance with this invention. To this end, external communication components 18 typically include components to connect to remote devices through any of a variety of networks (wired or wireless) including the Internet, a local or wide area network, or through any suitable electromagnetic carrier signals including infrared signals. Finally, it should be noted that each such module or component in FIG. 1 includes a controller for interfacing with other major system components which are connected through a bus 19 which may represent more than one physical bus.

As will be appreciated from the foregoing, document-descriptive and control information embedding, recovery and use, in accordance with the present invention, may be implemented in a variety of different ways. A system containing appropriate data recovery and reproduction hardware, e.g., a scanner and a printer together with software to control those processes as well as to control the embedding and use of the information is convenient. Of course, software-based instructions may also be realized, for example, using ASIC(s), digital signal processing circuitry, or the like. As such, the claim language "device-readable medium" includes not only software-carrying media, but also hardware having instructions for performing the required processing hardwired thereon, as well as a combination of hardware and software. Similarly, the claim language "program of instructions" includes both software and instructions embedded on hardware. Also, "module" as used in the claims covers any appropriately software or hardware that is capable of performing the functions recited. With these implementation alternatives in mind, it is to be understood that the figures and accompanying description provide the functional information one skilled in the art would require to write program code (i.e., software) or to fabricate circuits (i.e., hardware) to perform the processing required.

While the invention has been described in conjunction with several specific embodiments, many further alternatives, modifications, variations and applications will be apparent to those skilled in the art that in light of the foregoing description. Thus, the invention described herein is intended to embrace all such alternatives, modifications, variations and applications as may fall within the spirit and scope of the appended claims.

What is claimed is:

1. A method for controlling reproduction of a document, comprising:
   setting at least one document reproduction variable;
   scanning a document optically, to recover information embedded in the printed information in the document, the embedded information including information enabling a user to render a new document that is a variation of the scanned document; and
   reproducing some or all of the new document or variation thereof in accordance with the setting of at least one reproduction variable which was set prior to scanning the document, subject to any reproduction-control information contained in the embedded information, where the embedded information includes a password-protected edit-control scheme.

2. A method as recited in claim 1, wherein the at least one document reproduction variable includes at least one of a quality, a speed or a cost variable.

3. A method as recited in claim 1, wherein the reproduction-control information encodes a password-protected reproduction control scheme.

4. A method as recited in claim 3, wherein the reproduction-control information determines what part or parts of the document can be reproduced.

5. A method as recited in claim 1, wherein the edit control scheme is a multi-level password system that provides different levels of restrictions for different groups of users, such that a first group of users is granted full privileges with respect to editing the document and a second group of users is granted limited editing privileges.

6. A method as recited in claim 5, wherein the limited editing privileges are time sensitive.

7. A method as recited in claim 5, wherein the limited editing privileges are quantity sensitive.

8. An apparatus for performing the method recited in claim 1.

9. An apparatus as recited in claim 8, wherein a scanner and a printer or a copier are integrated in a same unit.

10. A computer-readable medium encoded with a program of instructions for performing the method recited in claim 1.

* * * * *

UNITED STATES PATENT AND TRADEMARK OFFICE
CERTIFICATE OF CORRECTION

PATENT NO.         : 7,428,076 B2
APPLICATION NO.    : 10/909456
DATED              : September 23, 2008
INVENTOR(S)        : Anoop K. Bhattacharjya et al.

It is certified that error appears in the above-identified patent and that said Letters Patent is hereby corrected as shown below:

Column 7, line 1 please change "where" to --wherein--

Signed and Sealed this

Twelfth Day of May, 2009

JOHN DOLL
*Acting Director of the United States Patent and Trademark Office*